Jan. 16, 1951     T. B. WINSOR ET AL     2,538,223

CLOD CRUSHING DRAG

Filed June 25, 1946

*INVENTORS*
Thomas B. Winsor
George B. Winsor

BY

*A. Schapps*

ATTORNEY

Patented Jan. 16, 1951

2,538,223

UNITED STATES PATENT OFFICE 2,538,223

CLOD CRUSHING DRAG

Thomas B. Winsor and George B. Winsor,
Milpitas, Calif.

Application June 25, 1946, Serial No. 679,131

1 Claim. (Cl. 55—22)

The present invention relates to clod smashers, and its principal object is to provide an agricultural implement operable for dragging over the ground surface to roll and grind and smash clods disposed on said surface.

Clod smashers of this type have heretofore principally been made of wood, with a series of transverse timbers or planks arranged in inclined and stepped relation for riding over the ground surface and for smashing the clods underneath the same.

It has been found, however, that the rear edges of the planks, which do the main part of the smashing, soon wear down and become rounded, thereby losing their efficiency to a great extent.

It is a further fact that wood does not scour and is not self-cleaning. As a consequence, dirt will adhere to the underface of the wooden clod smasher, and will collect in the pockets, particularly in the presence of a slight amount of moisture, with the result that the smasher becomes ineffective for the purposes for which it was designed.

In the present invention we propose to provide a metallic clod smasher which is self-cleaning to a greater extent than the wooden clod smasher, and which is constructed to resist wear at the critical points.

It is a further object of our invention to provide a clod smasher which is simple in construction, easy to manufacture, reinforced at the points subject to greatest wear, and at the same time relatively light in weight and easy to manipulate.

Further objects and advantages of our invention will appear as the specification proceeds, and the new and useful features of our farm implement will be fully defined in the claim attached hereto.

Figure 1:
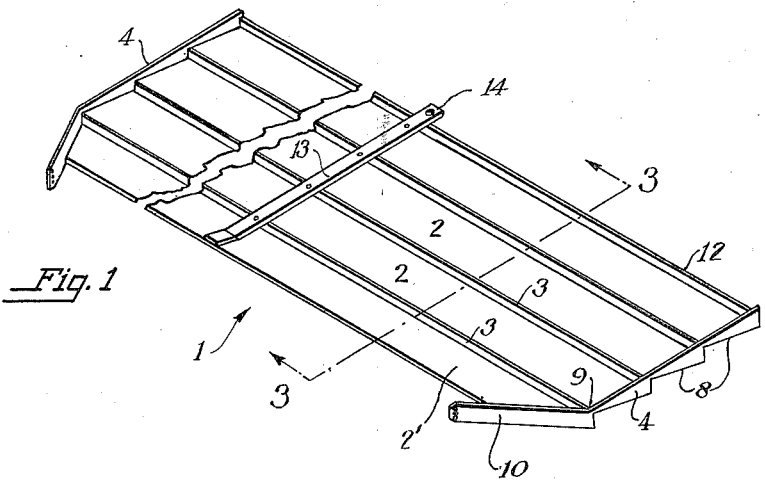
Figure 2:
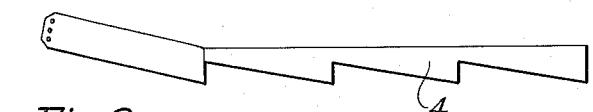
Figure 3:
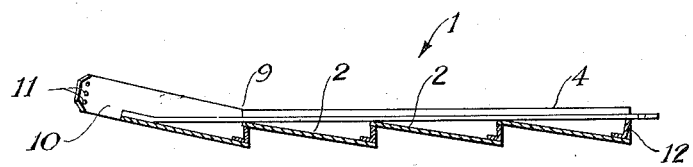
Figure 4:
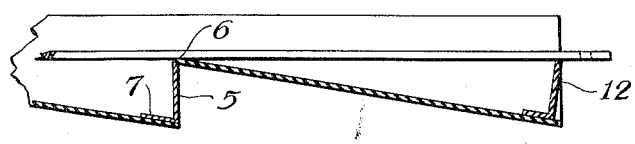

The preferred form of our invention is illustrated in the accompanying drawing, forming part of this application, in which:

Figure 1 shows an isometric view of our clod smasher;

Figure 2, a side view of the same;

Figure 3, a longitudinal section through the implement as seen from line 3—3 of Figure 1; and Figure 4, an enlarged detail view of the rear portion of said section.

While we have shown only the preferred form of our invention, it should be understood that various changes or modifications may be made within the scope of the claims hereto attached without departing from the spirit of the invention.

Referring to the drawing in detail, our clod smasher 1 comprises in its principal features, a number of transverse plates 2 arranged in successive and inclined relation, risers 3 interconnecting the plates 2, and side plates 4 mounted along opposite sides of the plate arrangement, all the members being preferably made of metal.

The transverse plates may be made of three sixteenths inch stock, about a foot wide and twelve feet long, although, of course, different dimensions may be selected.

In the arrangement shown. we use four of these plates in successive order, the plates being interconnected by the risers 3 to assume a stepped relation, slanting downward from front to rear so as to ride over the ground surface when the implement is dragged over the field and to roll and smash clods encountered in its path.

The first plate 2' is arranged at an angle somewhat steeper than that of the remaining plates to prevent clods or dirt from rolling over the front edge instead of being caught underneath the implement. As the cold smasher is advanced over the field, the clods are rolled forward with the implement, along the underfaces of the plates, and are broken up principally by the rear edges of the different plates.

The risers 3 are preferably made in the form of angle irons having vertical flanges 5 interconnecting the plates.

The upper edges of the vertical flanges 5 are usually welded to the front edges of the follower plates, as at 6, while the lower flanges 7 extend forwardly over the rear edges of the leader plates and are welded or otherwise secured thereto, these flanges running parallel to the incline of the plates.

In this manner the flanges 7 serve to reinforce the rear edges of the plates, which do the principal part of the smashing action and are subjected to the greatest wear.

The risers, in their preferred form, are two inches in height.

The side plates 4 are mounted along opposite sides of the transverse plates assembly and their bottom edges are stepped as at 8, to conform to the bottom contour of the transverse plate assembly. They are approximately three and one-half inches wide to project above the plate assembly and the risers by about one inch and a half.

The side plates are bent inward alongside of the side edges of the first plate, as shown at 9, to converge toward one another, the edges of the transverse plate being cut at a corresponding angle. They are also bent upward at the same point, so that their bottom edges register with the forward plate, as shown in Figure 3.

The front ends of the side plates project forward of the front transverse plate, as at 10, and are formed with vertical series of holes 11, which serve as anchoring means for a suitable draft element, such as a chain or the like.

At the rear edge of the last plate, we provide an angle iron 12 which reinforces the said edge.

A longitudinal bar 13 extends over the transverse plate assembly from front to rear, preferably over the centerline and serves to strengthen the entire assembly, and at the same time serves as an anchoring means for any other implement, such as a roller, which may be attached by means of the hole 14.

In use, the drag means, such as a chain, is secured to the front ends of the side plates, by means of the holes 11. The drag may be adjusted by proper selection to the holes.

If the weight of the implement is to be increased, it may be loaded with dirt or stones, loose or in sacks. As the implement is advanced, the steeper upward incline of the first plate will tend to keep the dirt or clods from rolling over the front edge, and the converging relation of the front sections of the side plates will steer the implement away from trees, fence posts and other objects to be cleared.

As the implement is dragged over the surface of the plowed field, it tends to roll and break the clods, the main breaking action taking place at the rear edges of the transverse plates. Since these edges are reinforced by the horizontal flanges of the risers, they will stand a great amount of wear, and the rear edges of the different plates will remain relatively sharp to effect the desired cutting and breaking action.

Since the plates are made of steel, or similar metal, their underfaces will scour, like plow shares, which will prevent or minimize accumulation of dirt, make the implement substantially self-cleaning, and will allow the clod smasher to be dragged over the ground surface with a minimum of draft effort, and with little interruption.

The whole implement is comparatively light in weight, well reinforced at critical points, as at the rear edges and the side edges, and easy to manipulate, particularly for the reason that little dirt or extraneous weight will adhere to the surfaces.

We claim:

A clod smasher comprising a metallic plate assembly having a series of inclined transverse metal plates arranged in stepped and successive relation with the front edge of each successive plate projecting over the rear edge of the preceding plate, vertical risers connecting the plates so as to form sharp angles therewith, the risers having flanges secured upon the rear edge of the plates for reinforcing the same, side plates secured upon the side edges of the plate assembly and having stepped lower edges to conform to the contour of the underface of the plate assembly and having upper edges projecting above the plate assembly, the front portions of the side plates being made to converge toward one another and to rise at an angle with respect to the body portions thereof and having anchoring means for a draft element in the front ends thereof, and the plate assembly being substantially symmetric in its upper and lower surfaces and having an unobstructed bottom surface.

THOMAS B. WINSOR.
GEORGE B. WINSOR.

REFERENCES CITED

The following references are of record in the file of this patent:

UNITED STATES PATENTS

| Number | Name | Date |
|---|---|---|
| 516,412 | Tigner | Mar. 13, 1894 |
| 621,584 | Reeds | Mar. 21, 1899 |
| 957,185 | Braun | May 10, 1910 |
| 1,217,228 | Smidley | Feb. 27, 1917 |

FOREIGN PATENTS

| Number | Country | Date |
|---|---|---|
| 31,780 | Norway | July 26, 1917 |